United States Patent [19]
Fukui

[11] Patent Number: 5,673,993
[45] Date of Patent: Oct. 7, 1997

[54] OPTICAL-AXIS ADJUSTMENT CHECKER FOR AUTOMOTIVE HEADLAMPS

[75] Inventor: Hitoshi Fukui, Minamiashigara, Japan

[73] Assignee: Ichikoh Industries, Ltd., Tokyo, Japan

[21] Appl. No.: 668,631

[22] Filed: Jul. 19, 1996

[30] Foreign Application Priority Data

Jun. 19, 1995 [JP] Japan .................................. 7-151855

[51] Int. Cl.$^6$ ..................................................... B60Q 1/068
[52] U.S. Cl. ............................. 362/66; 362/273; 362/289; 362/428
[58] Field of Search ........................... 362/61, 66, 80, 362/271, 273, 289, 418, 419, 421, 422, 424, 427, 428

[56] References Cited

U.S. PATENT DOCUMENTS

| | | | |
|---|---|---|---|
| 5,065,293 | 11/1991 | Mochizuki | 362/273 |
| 5,150,958 | 9/1992 | Miyazawa et al. | 362/66 |
| 5,197,794 | 3/1993 | Scott et al. | 362/66 |
| 5,197,799 | 3/1993 | Dehaene | 362/66 |
| 5,343,372 | 8/1994 | Shirai et al. | 362/66 |
| 5,607,220 | 3/1997 | Weihing et al. | 362/66 |

*Primary Examiner*—Alan Cariaso
*Attorney, Agent, or Firm*—Foley & Lardner

[57] ABSTRACT

A cylindrical member is formed integrally on a lamp housing and enclosing a threaded portion formed on the rear end of an aiming screw. First and second sliding members are disposed coaxially inside the cylindrical member around the threaded portion of the aiming screw. The first sliding member is slidable from first to second position in relation to the second sliding member. In the first or second position, the first and second sliding members are blocked from sliding relative to each other. The second sliding member has formed thereon an elastic flap having a stopper which is to be engaged in the cylindrical member when the first sliding member takes the first position. When the first sliding member is in the second position, the stopper is disengaged from the cylindrical member. Further, the second sliding member has formed thereon teeth which are engaged with the threaded portion upon disengagement. By turning the aiming screw, the first and second sliding members can be slid together in relation to the cylindrical member. Either of the first and second sliding members and the cylindrical member has formed thereon graduations and a reference-point mark, respectively, corresponding to the second position. The central one of the graduations coincides with the reference-point mark. The sliding distance of the first and second sliding members attained when the aiming screw is turned can be read from the relation between the graduations and reference-point mark and indicates the optical-axis adjustment of the tilting member.

6 Claims, 9 Drawing Sheets

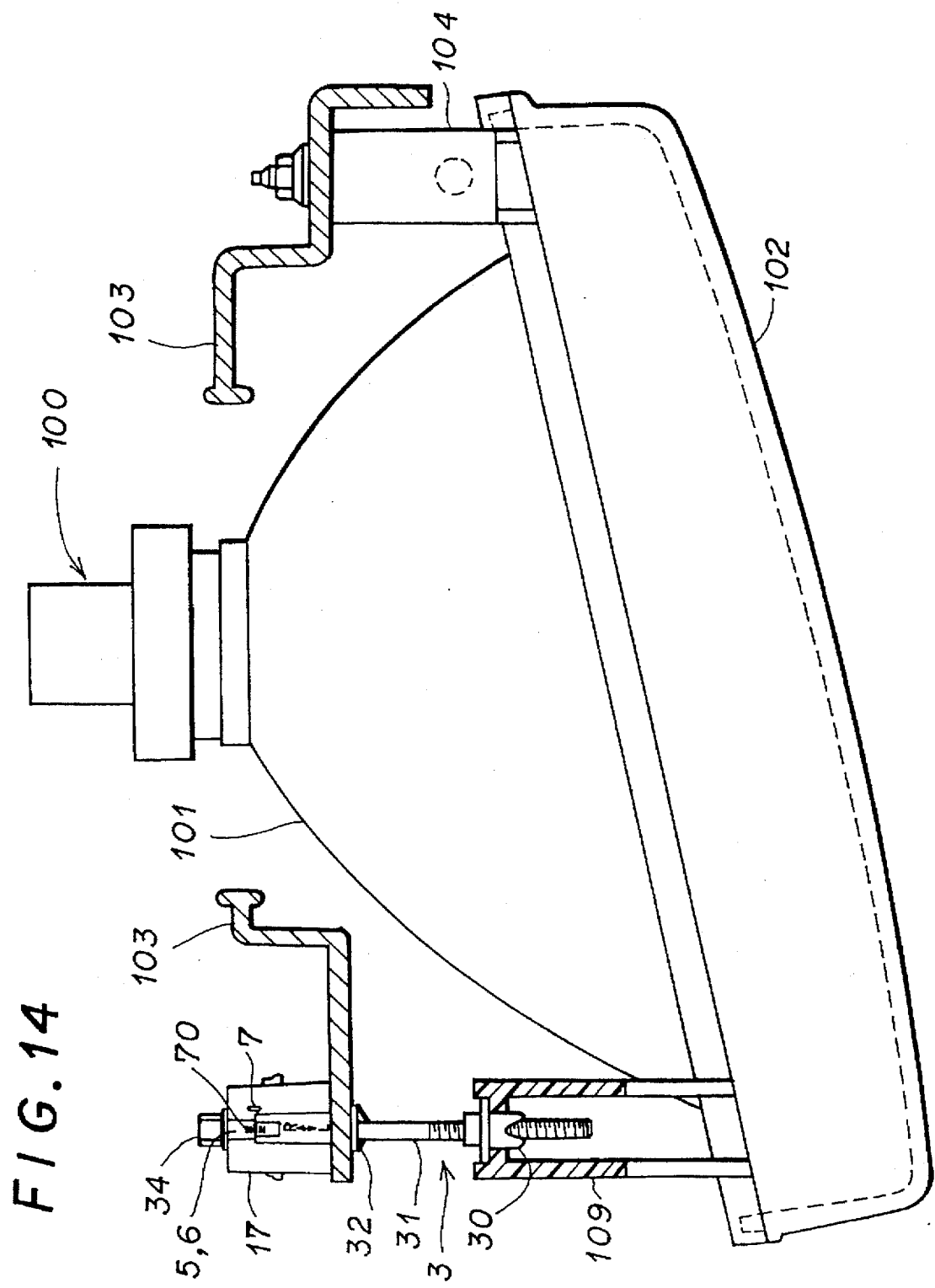

OPTICAL-AXIS ADJUSTMENT CHECKER FOR AUTOMOTIVE HEADLAMPS

BACKGROUND OF THE INVENTION a) Field of the Invention

The present invention relates to an optical-axis adjustment checker for automotive headlamps for marking an initial optical-axis setting of an automotive headlamp, and for checking for any deviation of the optical axis from the initial setting and providing an index for restoration of the initial optical-axis setting. More specifically, the invention relates to an automotive headlamp optical-axis adjustment checker comprising a reduced number of elements and permitting easy marking of the initial setting of an automotive headlamp optical axis.

Automotive headlamps generally include two types: the movable-reflector type and the movable-unit type. In movable-reflector type headlamps, the reflector is tiltable to adjust the optical-axis direction, and the lamp housing has the reflector tiltably mounted thereon. In movable-unit type headlamps, the lamp unit is tiltably mounted on a car body for adjusting the optical-axis direction. For simplicity of explanation, it is assumed herein, unless otherwise specified, that the optical-axis adjustment checker according to the present invention is installed on a movable-reflector type headlamp. Namely, the optical-axis adjustment checker is to be installed on the lamp housing and the reflector is tiltable for adjusting the optical-axis direction of the headlamp.

b) Description of the Prior Art

If directed too far upward, a light beam from an automotive headlamp will interfere with the vision of the driver of a car running in the opposite lane, possibly causing a danger. On the contrary, if directed too far downward, the headlamp will not sufficiently illuminate the road surface in front of the car for assurance of driving safety. Further, if the light beam from the headlamp greatly deviates in the horizontal direction, the road surface in front of the car will not be appropriately illuminated, also causing a danger. To avoid such dangers, the automotive headlamp should have the optical-axis direction thereof correctly set. Therefore, the automotive headlamp is provided with mechanisms fixed on the car body to adjust the direction or inclination of the optical axis vertically and horizontally.

A typical automotive headlamp of the above movable reflector type is known from the disclosure in U.S. Pat. No. 5,065,293. In this headlamp, a reflector is supported on a lamp housing by means of three mechanisms: a pivot bearing, a horizontal optical-axis adjuster and a vertical optical-axis adjuster. The reflector for which the optical-axis direction is to be adjusted has a lamp bulb secured therein. Each of the horizontal and vertical optical-axis adjusters comprises an aiming screw mounted rotatably in an axially stationary mounting on the lamp housing, and a corresponding nut fixed to the reflector. As the aiming screw is turned, the reflector is tilted horizontally or vertically with respect to the lamp housing, thereby adjusting the optical-axis direction thereof.

The direction or inclination of the headlamp optical axis must be set with high accuracy. This can only be attained by specialists using special equipment. Therefore, before shipment of a car from the automobile manufacturing works or when the headlamps are installed on a car at a service shop, the optical axes of the headlamps are initially set by the specialists there using special equipment. After initially set, it sometimes becomes necessary to readjust the optical-axis direction of the headlamp. In these cases, the optical-axis direction can be readjusted while ascertaining, by using an optical-axis adjustment checker, how much the direction of optical axis is to be adjusted.

Various optical-axis adjustment checkers have been proposed so far. A typical one of such devices is disclosed in U.S. Pat. No. 5,065,293.

The optical axis adjustment checker in this reference is referred to as an "inclination measuring device". It is interposed between a protruding portion of the aiming screw from the lamp housing and the lamp housing itself to measure the inclination of the reflector. The inclination measuring device comprises a guide member supported on the lamp housing and extending approximately in parallel with the protruding portion of the aiming screw, a sliding member screwed onto the protruding portion of the aiming screw and mounted slidably on the guide member, and a linear scale and reference mark formed between the guide and sliding members to indicate a relative displacement between the guide and sliding members.

In this device, as the aiming screw is turned to pivot the reflector in the upward-downward direction or rightward-leftward direction in relation to the lamp housing, thereby adjusting the upward-downward direction of the optical axis, the sliding member is moved axially with respect to the aiming screw as the aiming screw is turned. The displacement of the sliding member relative to the scale can be used to determine the amount of adjustment of the optical-axis direction. Thus, it is possible to readjust the optical-axis direction of the reflector while checking the amount of adjustment of the optical-axis direction.

The sliding member is threadedly engaged with the protruding portion of the aiming screw in the above device such that the sliding member slides axially with respect to the aiming screw when the optical axis of the reflector is initially set. Thus, after completion of the initial setting of the reflector optical axis, the reference point on the scale on the sliding member does not coincide with the zero point on the scale on the guide member. For the coincidence of the reference point on the scale of the sliding member with the zero point on the scale of the guide member, the zero-point aiming screw has to be turned to slide the sliding member along the guide member.

The conventional device uses the guide member, sliding member, zero point aiming screw, and a nut and other parts to mount the zero-point aiming screw to the sliding member.

SUMMARY OF THE INVENTION

An object of the present invention is to provide an automotive headlamp optical-axis adjustment checker which comprises a reduced number of elements and which permits easy marking of the initial setting of the automotive-headlamp optical axis.

The above object can be accomplished by providing an optical-axis adjustment checker for use on an automotive headlamp comprising a base member, a tilting member supported on the base member by means of a pivot, and a horizontal optical-axis adjuster and a vertical optical-axis adjuster. Each of the horizontal and vertical optical-axis adjusters includes an axially stationary aiming screw mounted on the base member rotatably, and a nut member mounted on the tilting member and engaged with one end portion of the aiming screw, such that the tilting member may be tilted horizontally or vertically in relation to the base member by manually turning the aiming screw, thereby adjusting the optical-axis direction of the headlamp. The optical-axis adjustment checker may comprise, according to the present invention, a threaded portion formed on the other end portion of the aiming screw, a cylindrical member formed enclosing the threaded portion and integrally with the base member, a first cylindrical sliding member disposed coaxially inside the cylindrical member and enclosing the threaded portion, the first sliding member being slidable axially, a second sliding cylindrical member disposed coaxially inside the first sliding member, and graduations and reference-point marks formed on either of the first and second sliding members and on the base member in correspondence to the second position of the first sliding member.

The first sliding member is slidable from a first to second position in relation to the second sliding member. There is provided between the first and second sliding members a means for preventing the first and second sliding members from sliding relative to each other when the first sliding member is in the first or second position. The second sliding member includes elastic flap members, one of which has at least a stopper which is elastically engaged with the cylindrical member when the first sliding member is in the first position. When the first sliding member is slid from the first to second position, the stopper is elastically disengaged from the cylindrical member. The elastic flap members have formed integrally thereon teeth which are put into engagement with the treaded portion of the aiming screw upon the elastic disengagement of the stopper. The movement of the first and second sliding members which slide together as the aiming screw is turned by hand can be used to determine the amount of adjustment of the optical-axis direction of the tilting member.

In the optical-axis adjustment checker according to the present invention, when the first sliding member is in the first position, the first and second sliding members are prevented from moving relative to each other and the second sliding member is elastically inhibited from sliding relative to the cylindrical member. Therefore, the optical axis of the tilting member can be initially set by turning the aiming screw by hand. When the first sliding member is slid in relation to the second sliding member after initially setting the optical axis of the tilting member, the first and second sliding members are blocked from moving in relation to each other and the second sliding member is enabled to slide in relation to the cylindrical member, so that the teeth are engaged with the threaded portion of the aiming screw. Since the central graduation can be made to coincide with the reference-point mark by sliding the first sliding member from the first to second position in relation to the second sliding member, the first and second sliding members are axially moved together by turning the aiming screw by hand after the sliding from the first to second position, and this movement of the first and second sliding members can be read on the graduations and reference-point mark in terms of the adjusted amount of the optical-axis direction of the tilting member.

How the foregoing and other more specific objects of the present invention are achieved will appear in the following detailed description of two illustrative embodiments of the present invention which are set forth in reference to the drawings.

BRIEF DESCRIPTION OF THE DRAWINGS

FIG. 14 is a fragmentary plan view of a movable-unit type automotive headlamp equipped with a second embodiment of the automotive headlamp optical-axis adjustment checker according to the present invention.

DETAILED DESCRIPTION OF PREFERRED EMBODIMENT

FIGS. 1 to 13 show together a first embodiment of an automotive optical-axis adjustment checker according to the present invention. This embodiment concerns an optical-axis adjustment checker for movable-reflector type automotive headlamps.

Figure 1:
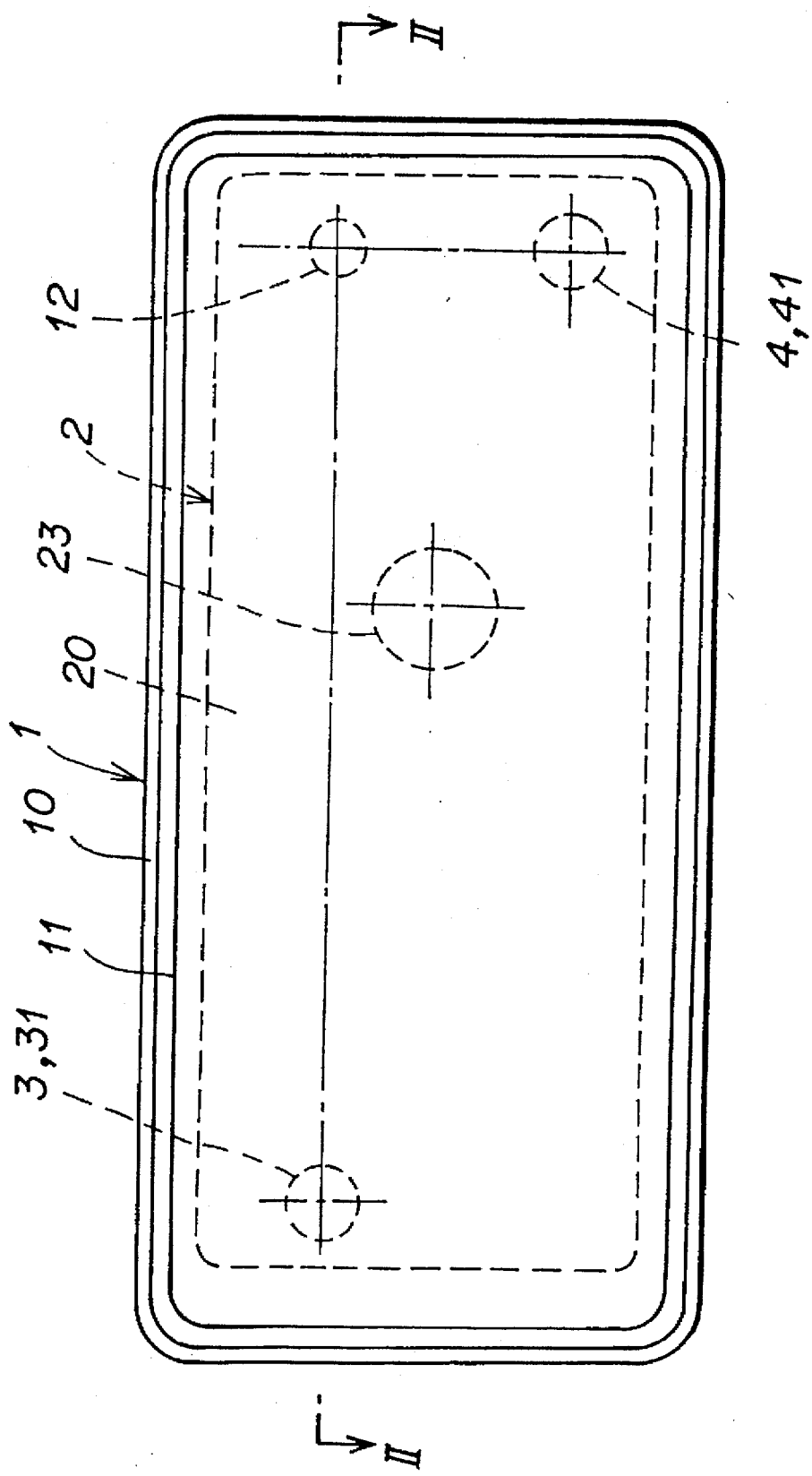
FIG. 1 is a front view of a movable-reflector type automotive headlamp equipped with a first embodiment of the automotive headlamp optical-axis adjustment checker according to the present invention.
Figure 2:
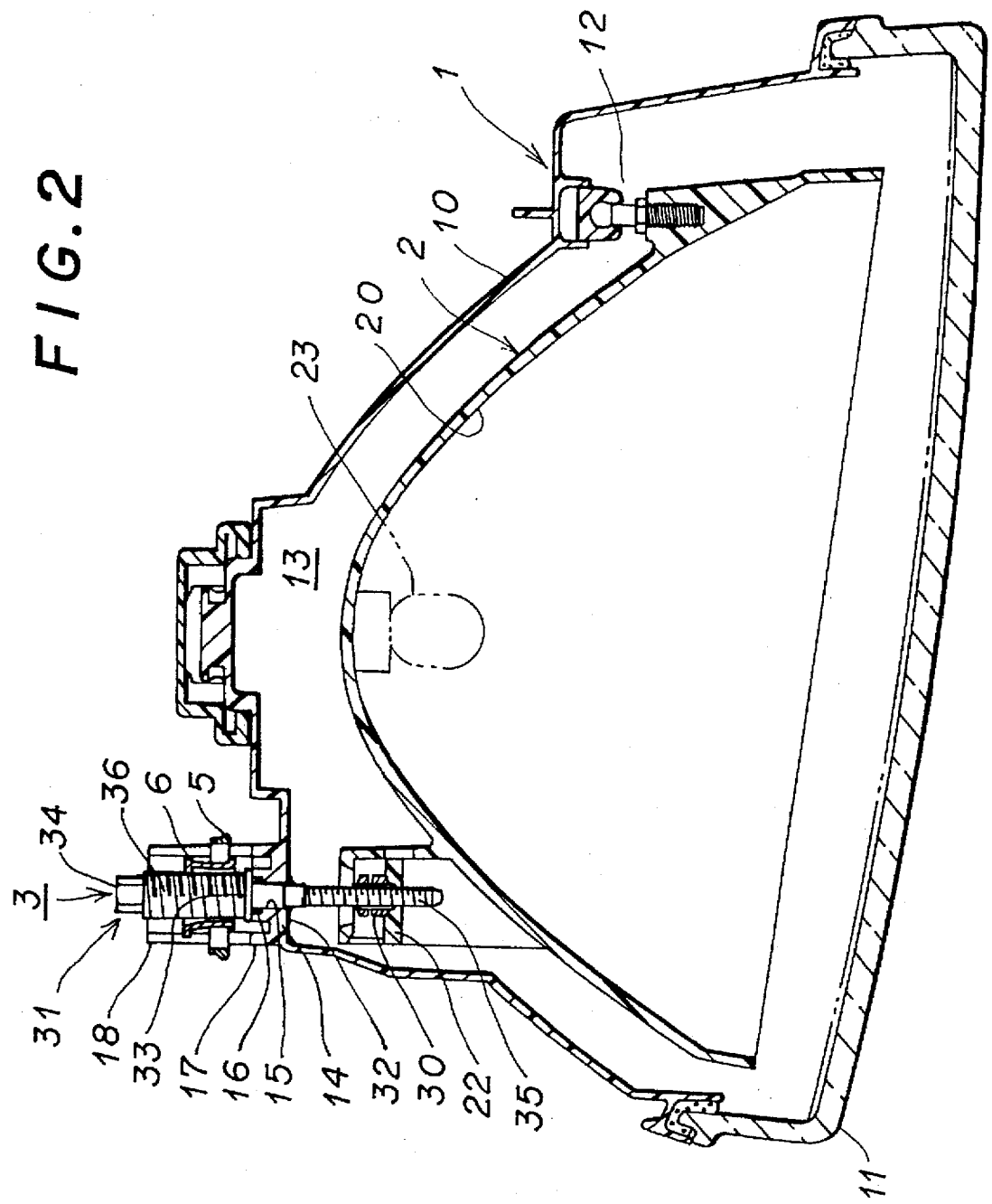
FIG. 2 is a sectional view taken along the line II—II in FIG. 1.

In FIGS. 1 and 2, reference numeral 1 generally indicates an automotive headlamp. The headlamp 1 comprises a lamp housing 10 on which an optical axis adjuster is to be mounted, and a lens 11. The lamp body 10 and lens 11 define together a bulb space 13.

Inside the bulb space 13, a movable reflector 2 by which the optical axis is to be adjusted is supported on the lamp housing 10 at three points, namely, by means of a pivot 12 located at the upper right as viewed from the front (FIG. 1), a horizontal optical-axis adjuster 3 located at the upper left, and a vertical optical-axis adjuster 4 located at the lower right.

The movable reflector 2 has formed on the front side thereof a reflecting surface 20 being, for example, a part of a paraboloid of revolution. There is provided detachably a lamp bulb 23 at the side of the reflecting surface 20 of the movable reflector 2. When turned on, the lamp bulb 23 emits light. The light is reflected at the reflecting surface 20 and the reflected light is irradiated through the lens 11 forwardly of the headlamp 1 to provide a predetermined pattern of luminous intensity distribution.

The horizontal optical-axis adjuster 3 comprises an aiming screw 31 and others and the vertical optical-axis adjuster 4 comprises an aiming screw 41 and others. The aiming screws 31 and 41 are mounted in the lamp housing 10 so as to be rotatable but axially stationary. By turning the aiming screw 31 of the horizontal optical-axis adjuster 3 or the aiming screw 41 of the vertical optical-axis adjuster 4, the movable reflector 2 (along with the lamp bulb 23) can be pivoted horizontally about the vertical axis (imaginary line connecting the pivot 12 and vertical optical-axis adjuster 4) or vertically about the horizontal axis (imaginary line connecting the pivot 12 and horizontal optical-axis adjuster 3) in relation to the lamp housing 10 to adjust the optical-axis direction of the headlamp 1.

The horizontal optical-axis adjuster 3 will be described herebelow.

First, the lamp housing 10 has a mounting boss 14 formed integrally on the outer surface thereof in a position where the horizontal optical-axis adjuster 3 is to be provided. The mounting boss 14 has formed in the center thereof a circular through-hole 15 in which the aiming screw 31 is held so as to be rotatable but axially stationary by an assembly 32 of a push nut and a wave washer which cooperates with a flange 33 integrally formed nearly at the center of the aiming screw 31. The aiming screw 31 protrudes outwardly at its first end thereof from the outer surface of the mounting boss 14 of the lamp housing 10. The first end of the aiming screw 31 is formed to have a coupling such as a hexagonal head 34 on which an adjusting tool may be applied to drive the screw 31 for horizontal adjustment of the headlamp optical-axis direction. An O-ring 16 is provided between the outer surface of the mounting boss 14 and the flange 33 of the aiming screw 31 to provide water tightness between the lamp housing 10 and aiming screw 31.

On the other hand, the movable reflector 2 has a cylindrical member 22 formed integrally on the rear surface thereof in a position where the horizontal optical-axis adjuster 3 is to be provided. The cylindrical member 22 has a screw mount 30 held therein so as to be non-rotatable about the axis of the aiming screw 31. The screw mount 30 has screwed therein a threaded portion 36 at the second end of the aiming screw 31. The threaded portion is located within the bulb space 13.

When the hexagonal head 34 of the aiming screw 31 is turned by hand or with a driving tool, the screw mount 30 moves axially with respect to the aiming screw 31 under the action of screwdriving and thus the movable reflector 2 tilts horizontally about a vertical axis (imaginary line connecting the pivot 12 and vertical optical-axis adjuster 4).

It should be noted that the construction and action of the vertical optical-axis adjuster 4 is generally the same as that of the horizontal optical-axis adjuster 3.

The optical-axis adjustment checker for the horizontal optical-axis adjuster 3 will be discussed in detail herebelow.

The aiming screw 31 is threaded as indicated with reference numeral 36 between the flange 33 at the first end thereof protruding out of the lamp housing 10 and the hexagonal head 34 thereof. The threaded portion 36 has fitted thereon first and second sliding members 5 and 6.

On the other hand, the lamp housing 10 has integrally formed on the outer surface and outside the mounting boss 14 a cylindrical member 17 which encloses the threaded portion 36 of the aiming screw 31 and the first and second sliding members 6. The cylindrical member 17 has the first and second sliding members 5 and 6 mounted thereto so as to be non-rotatable about the axis of the aiming screw 31 and axially slidable with respect to the aiming screw 31.

More specifically, the cylindrical member 17 has formed therein two parallel sliding recesses 18 located on radially opposing sides of the cylindrical member 17 and extending axially in parallel with the aiming screw 31. On the other hand, the first sliding member 5 has formed integrally therewith a pair of T-formed detents 50 each consisting of a horizontal extension perpendicular to the axis of the first sliding member 5 and a vertical extension generally perpendicular to the sliding recess 18. The detents 50 correspond to the sliding recesses 18, respectively. Since the opposite horizontal extensions of the detents 50 are guided in the opposite sliding recesses 18, respectively, the first and second sliding members 5 and 6 can be installed in the cylindrical member 17 so as to be non-rotatable about the axis of the aiming screw 31 and axially slidable with respect to the aiming screw 31.

The second sliding member 6 is fitted on the threaded portion 36 of the aiming screw 31, and the first sliding member 5 is so fitted on the second sliding member 6 as to be axially slidable from a first position (shown in FIG. 5) to a second position (shown in FIG. 6) of the aiming screw 31.

The second sliding member 6 is provided with two elastic flaps 61 and 62 which are tiltable radially outward of the aiming screw 31. When the second sliding member 6 is fitted on the aiming screw 31, the first flap 61 is forced outward toward the cylindrical member 17. The first flap 61 has a stopper 63 formed integrally on the outer surface thereof and a tooth 64 formed integrally on the inner surface thereof.

When the second sliding member 6 is fitted on the aiming screw 31, the second flap 62 is forced radially outward of the aiming screw 31. The second flap 62 has three teeth 65 formed integrally on the inner surface thereof and at every two pitches of the aiming screw 31.

When the first sliding member 5 is in the first position, the first flap 61 is elastically tilted radially outward so that the stopper 63 of the first flap 61 engages a cut 19 formed across one of the sliding recesses 18 in the cylindrical member 17 to limit the first and second sliding members 5 and 6 from sliding relative to the cylindrical member 17. When the first sliding member 5 is slid to the second position, the inner wall thereof forces the first flap 61 radially inward, which in turn will tilt against its own elasticity so that the stopper 63 of the flap 61 is disengaged from the cut 19 in the cylindrical member 17, thus allowing the first and second sliding members 5 and 6 to slide relative to the cylindrical member 17.

When in the second position, the first sliding member 5 forces the first flap 61 inward so that the tooth 64 of the first flap 61 meshes with the threaded portion 36 of the aiming screw 31.

On the other hand, when the first sliding member 5 is in the first position, the second flap 62 tilts inward under the effect of elasticity. However, when the optical axis of the movable reflector 2 is initially set by turning the aiming screw 3, the teeth 65 of the second flap 62 can override the threads 36 of the aiming screw 31 because of the elastic properties of the second flap 62. Consequently, the optical axis of the movable reflector 2 can be initially set without any inconvenience. Also, when the first sliding member 5 is in the second position, the inward pressing of the second flap 62 by the first sliding member 5 and the normal elasticity of the second flap 62 cause the teeth 65 of the second flap 62 to engage with the threads 36 of the aiming screw 31.

Simultaneously with the disengagement of the stopper 63 of the first flap 61 from the cylindrical member 17, the teeth 64 and 65 mesh with the threads 36 of the aiming screw 31 so that the first sliding member 5 can be slid together with the second sliding member 6 by turning the aiming screw 31.

The first sliding member 5 has formed thereon an odd number of graduations including shorter projections 70 and a central longer projection 74. The projection 74 provides a reference graduation. The graduations 70 and 74 are provided axially equidistant of the aiming screw 31. The cylindrical member 17 has a step 72 integrally formed thereon. The step 72 has an end face 73 perpendicular to the axis of the aiming screw 31 which serves as a reference point 7. The cylindrical member 17 has also formed therein and over the step 72 a cut 71 through which the graduations 70 and 74 on the first sliding member 5 can be viewed from the outside. The graduations 70 and reference point 7 are provided for the second position of the first sliding member 5.

Setting the end face 73 as the reference point 7 on the cylindrical member 17 to the reference graduation 74 formed on the first sliding member 5 is called the "initial setting" herein. Note that a "0" mark is provided adjacent the end face 73 of the cylindrical member 17, and characters "L" and "R" and a bidirectional arrow are marked on the top of the step 72.

The "initial setting" can be completed only by sliding the first sliding member to the second position. The distance over which the first and second sliding members 5 and 6 are made to slide relative to each other by turning the aiming screw 31 indicates an adjusted amount of the optical-axis direction of the movable reflector 2.

The first and second sliding members 5 and 6 are provided with a first positioner for the first position of the first sliding member 5, a second positioner for the second position of the first sliding member 5, and a detent to block relative rotation of the first and second sliding members 5 and 6.

More specifically, the first sliding member 5 has four small square through-holes 51 formed therein, while the second sliding member 6 has formed thereon four elastic pawls 66 flexible radially of the sliding member 6 and corresponding to the through-holes 51. When moved until the elastic pawls 66 are engaged in the through holes 51, the sliding member 5 reaches the first position. Thus the through-holes 51 and pawls 66 form together the first positioner.

Each of the elastic pawls 66 has an outer surface slanted radially outward and upward toward the second position from the base thereof at the side of the first position, and has a top end the face of which is radially horizontal. Therefore, when the first sliding member 5 is slid from the first to the second position, the edge of the through hole 51 moves along the slanted outer surface of the elastic pawl 66 so that the elastic pawl 66 is smoothly disengaged from the through-hole 51. When the first sliding member 5 is in the second position, the bottom end thereof abuts the horizontal end face of the elastic pawl 66 to block the first sliding member 5 from returning from the second to the first position.

Further, the second sliding member 6 has formed thereon four stoppers 67 corresponding to the elastic pawls 66. When fitted on the second sliding member 6 between the elastic pawls 66 and stoppers 67, the first sliding member 5 takes the second position in which the first and second sliding members 5 and 6 will be slidable together on the aiming screw 31. That is to say, the elastic pawls 66 and stoppers 67 form together the second positioner.

Moreover, the first sliding member 5 has formed on the inner wall thereof two flat surface portions 52, one of which has a recess 53 formed therein. On the other hand, the second sliding member 6 has formed on the outer surface thereof two flat surface portions 68 corresponding to the flat surface portions 52, and one of which has formed axially thereon a projection 69 corresponding to the recess 53 in the first sliding member 5. When the second sliding member 6 is introduced in the first sliding member 5 and the flat surface portions 52 of the first sliding member 5 are made to abut the flat surface portions 68, respectively, of the second sliding member 6 while the projection 69 is engaged in the recess 53, the first and second sliding members 5 and 6 can be prevented from rotating relative to each other. Also, the first sliding member 5 has two projections 56 formed integrally at the top end thereof. When the first sliding member 5 is placed in the second position, the projections 56 are fitted between the two stoppers 67 on the second sliding member 6 to prevent the first and second sliding members 5 and 6 from rotating in relation to each other. Namely, the flat surface portions 52 and 68, recess 53 and projections 69, and projections 56 and stoppers 67 form together the above-mentioned detent.

Furthermore, the first sliding member 5 has four small projections 54 provided axially on the outer circumference thereof, while the second sliding member 6 has four small projections 60 provided axially on the inner wall thereof. These small projections 54 and 60 are provided to assure that the first and second sliding members 5 and 6 slide smoothly inside the cylindrical member 17 and on the threaded portion 36 of the aiming screw 31.

The first sliding member 5 has a small projection 55 formed on the top end thereof. When the first sliding member 5 is fitted on the second sliding member 6, the projection 55 prevents the second flap 62 of the second sliding member 6 from being turned outwardly to thereby ensure positive engagement of the teeth 65 of the second flap 62 with the threads 36 on the aiming screw 31.

The first embodiment of the optical-axis adjustment checker according to the present invention has a structure as described above. Its functions will be discussed below.

Figure 5:
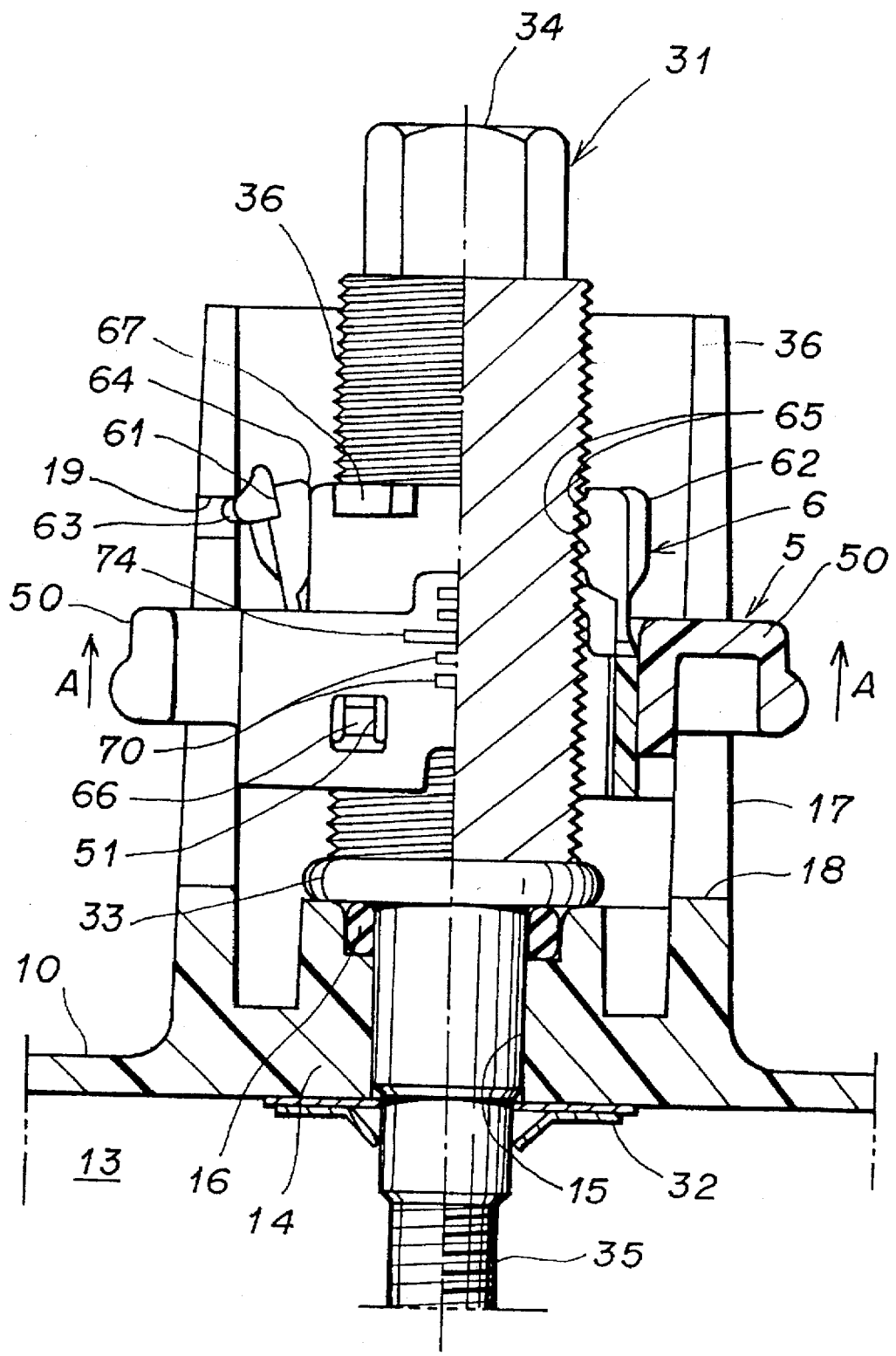
FIG. 5 is a partial sectional view of the essential elements, showing the first sliding member in a first position.
Figure 6:
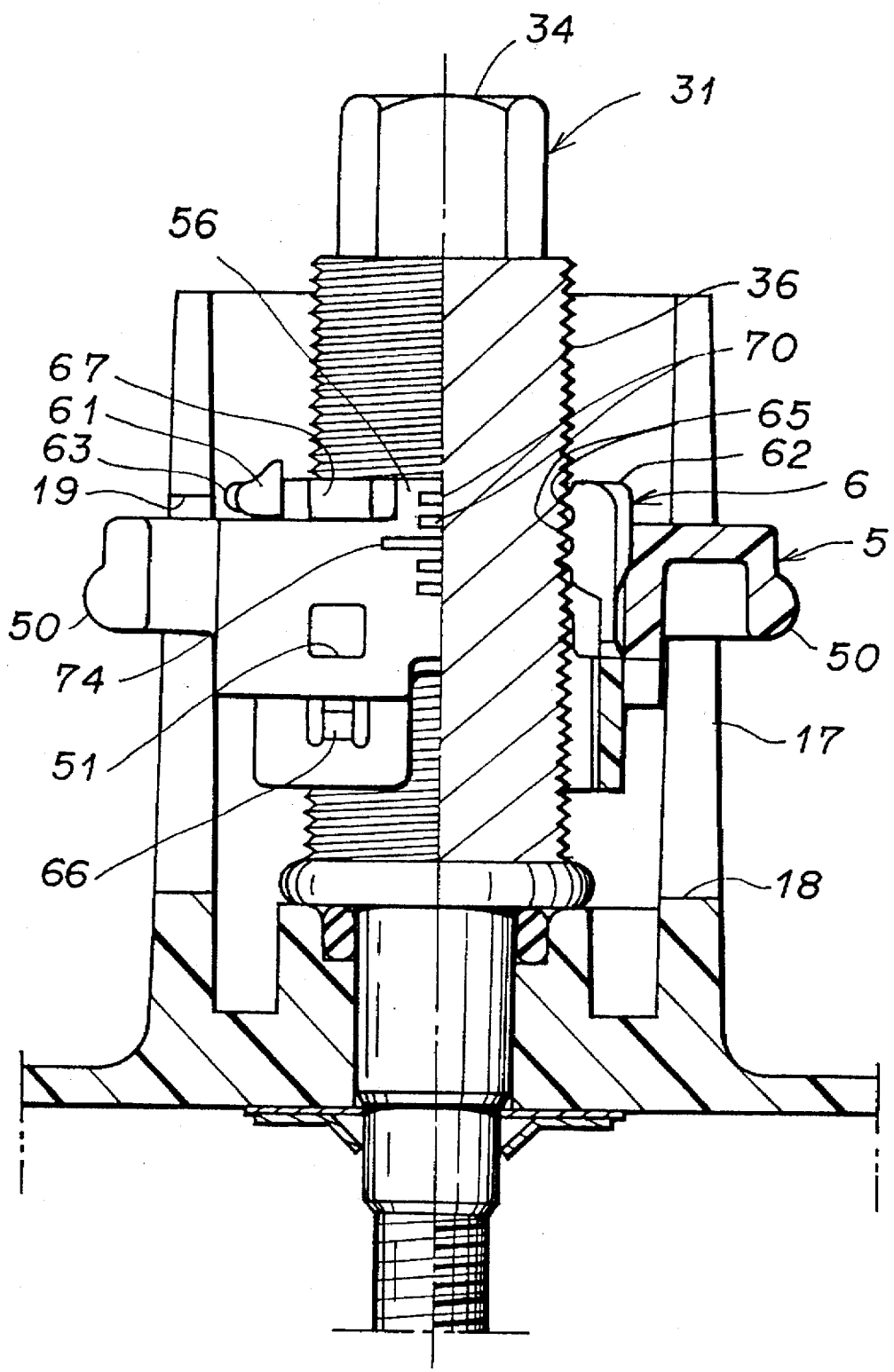
FIG. 6 is a partial sectional view of the essential elements, showing the first sliding member in a second position.
Figure 7:
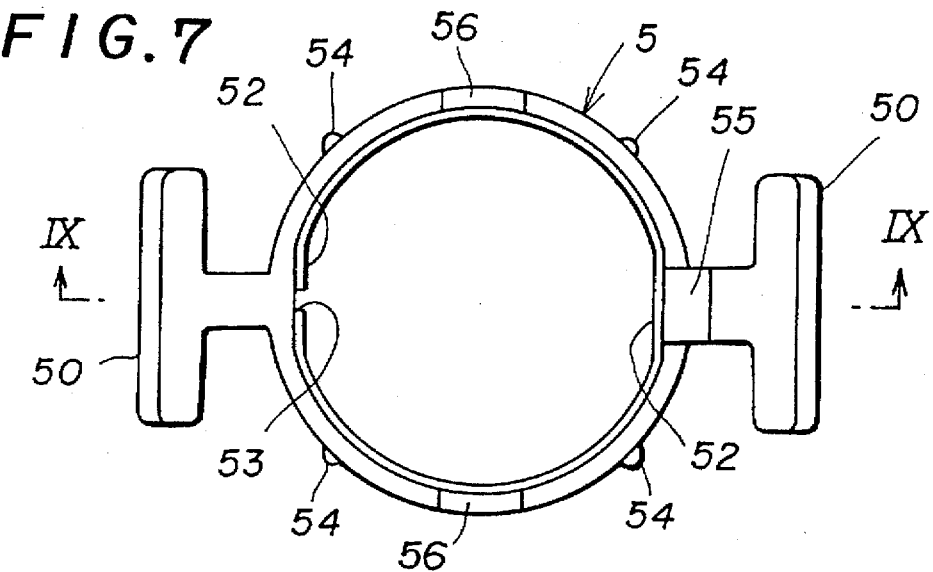
FIG. 7 is a plan view of the first sliding member.
Figure 8:
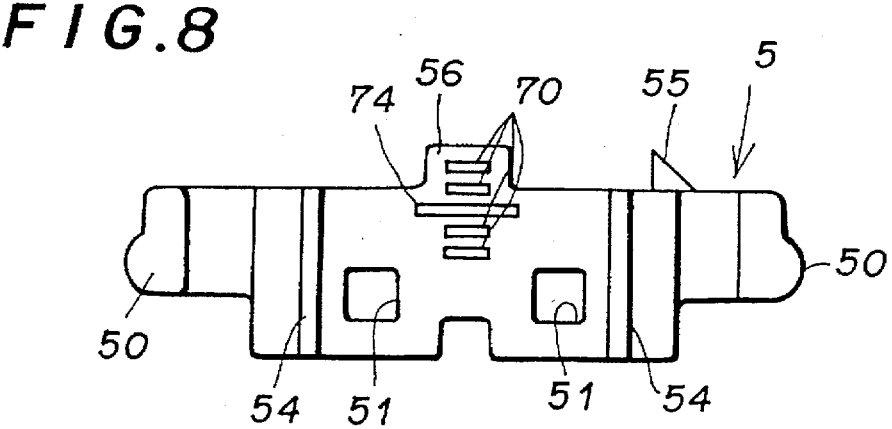
FIG. 8 is a front view of the first sliding member.
Figure 9:
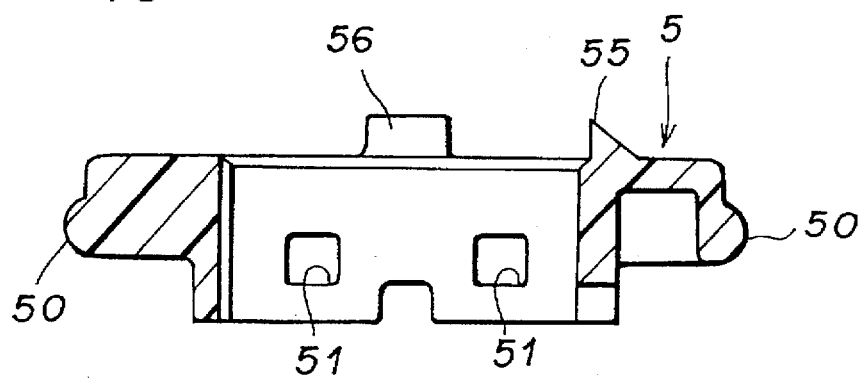
FIG. 9 is a sectional view taken along the line IX—IX in FIG. 7.
Figure 10:
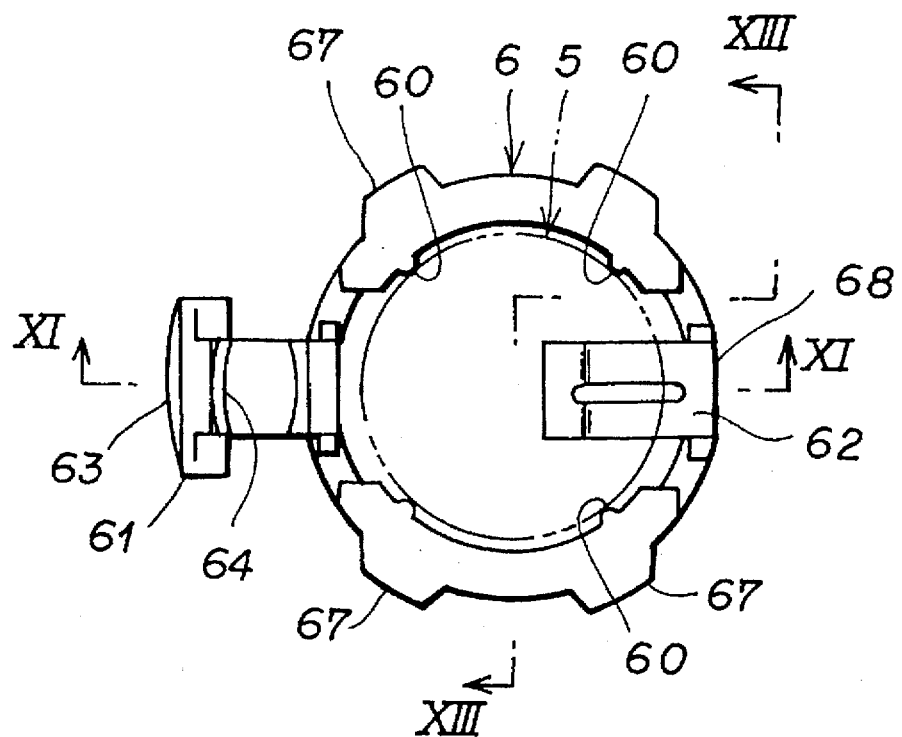
FIG. 10 is a plan view of the second sliding member.
Figure 11:
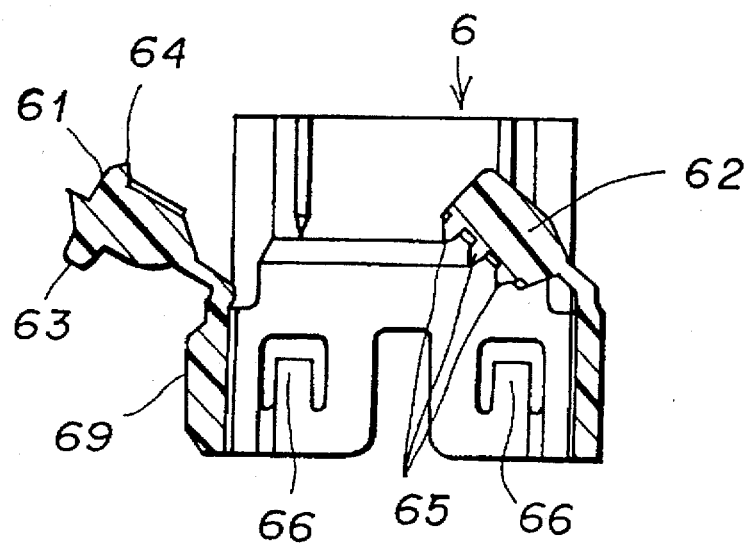
FIG. 11 is a sectional view taken along the line XI—XI in FIG. 10.
Figure 12:
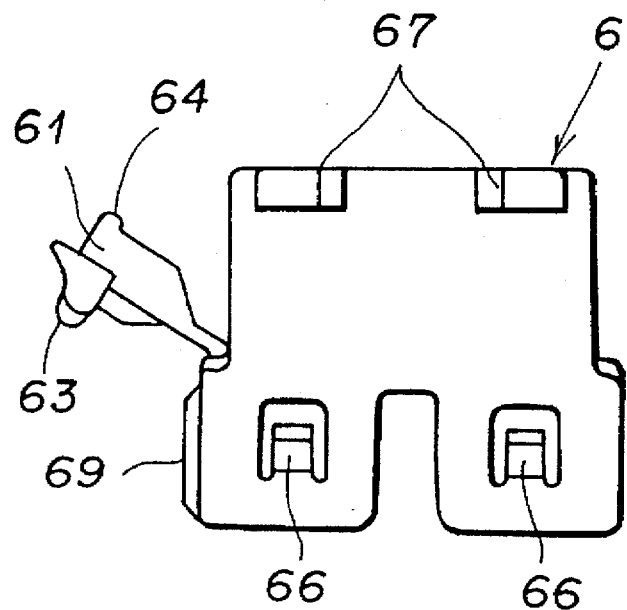
FIG. 12 is a front view of the second sliding member.
Figure 13:
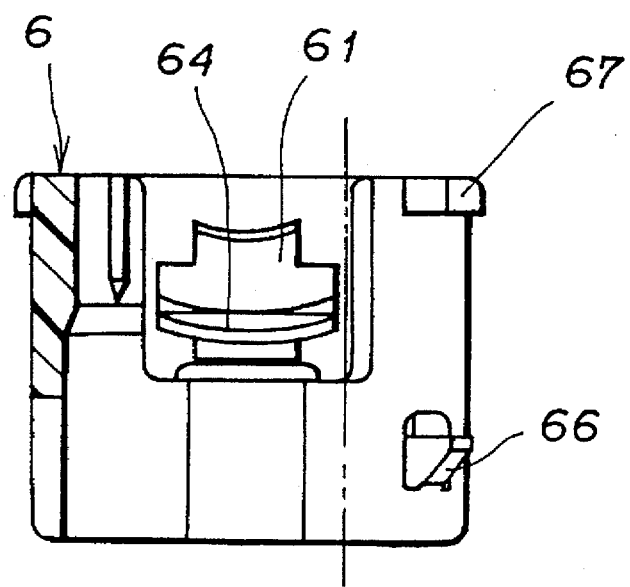
FIG. 13 is a sectional view taken along the line XIII—XIII in FIG. 10.

As shown in FIG. 5, when the elastic pawls 66 of the second sliding member 6 are elastically engaged into the through-holes 51 in the first sliding member 5, the first sliding member 5 will take the first position.

At this time, the stopper 63 formed on the first flap 61 of the second sliding member 6 is engaged into the cut 19 in the cylindrical member 17 and blocks the first and second sliding members 5 and 6 from sliding in relation to the cylindrical member 17 integral with the lamp housing 10 and carrying the aiming screw 31. Only by sliding the first sliding member 5 from the first position (shown in FIG. 5) to the second position (shown in FIG. 6) after completion of the initial optical-axis setting of the movable reflector 2 does the central longest graduation 74 of the graduations 70 formed on the first sliding member 5 coincide with the reference point mark 7 on the cylindrical member 17. The "initial setting" can thus be done very simply.

Figure 3:
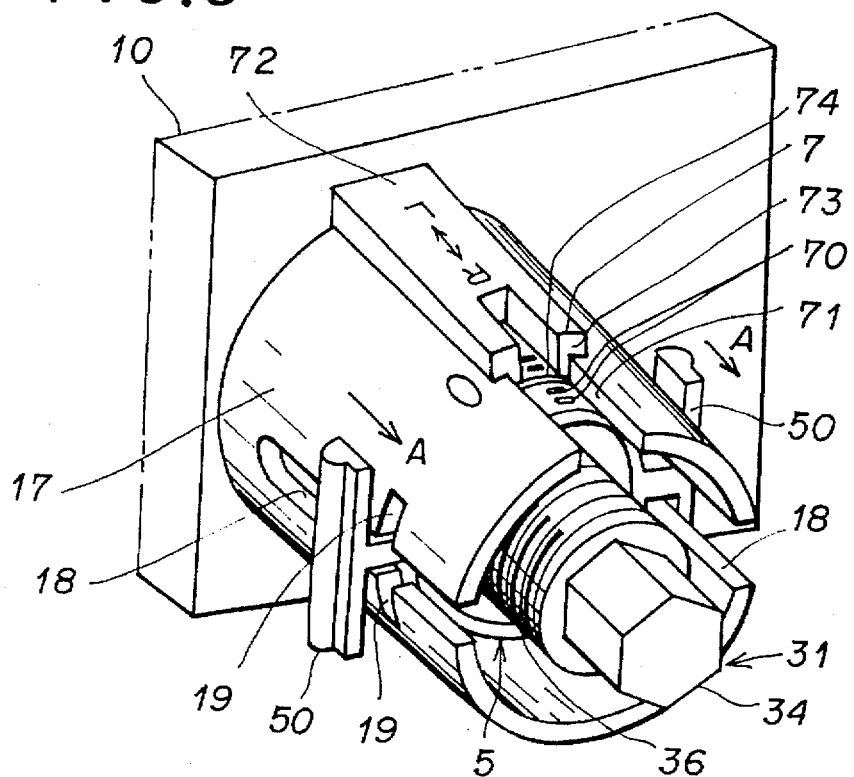
FIG. 3 is a perspective view of the essential elements of a first embodiment of the present invention.
Figure 4:
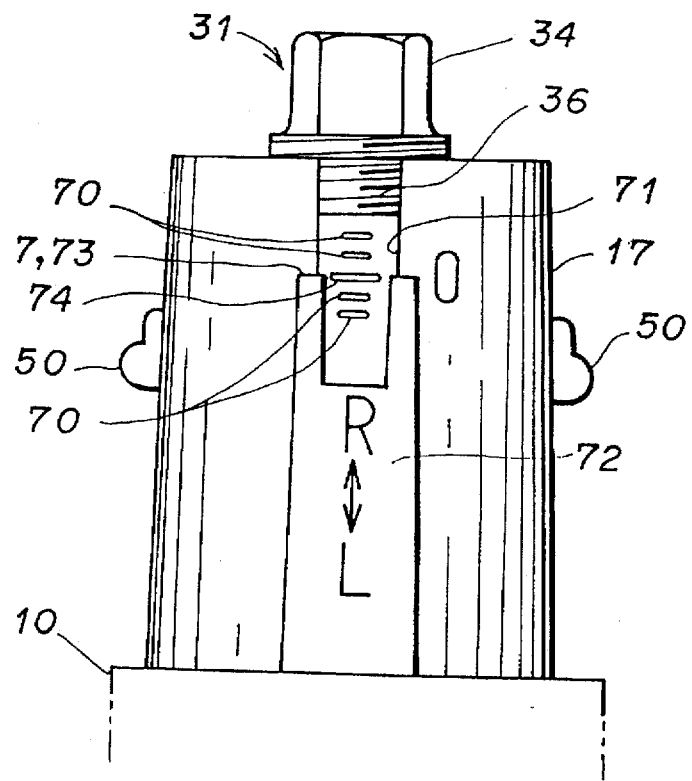
FIG. 4 is a plan view of the essential elements in FIG. 3.

Next, when the detents 50 of the first sliding member 5 are pressed in the direction of arrow A in FIGS. 3 and 5 by hand or with a tool, the elastic pawls 66 of the second sliding member 6 are disengaged from the through-holes 51 in the first sliding member 5 since the stopper 63 of the second sliding member 6 is engaged in the cut 19 in the cylindrical member 17, thus blocking the second sliding member 6 from moving in the direction of arrow A. As a result, the first sliding member 5 will slide in the direction of arrow A in relation to the second sliding member 6 and thus take the second position.

When the first sliding member 5 reaches the second position, the stopper 63 will be disengaged from the cuts 19 and at the same time the teeth 64 and 65 will get in mesh with the threads 36 on the aiming screw 31, so that the first and second sliding members 5 and 6 are enabled to slide together as the aiming screw 31 is turned.

After the first sliding member 5 is placed in the second position, the optical-axis direction of the movable reflector 2 can be readjusted by turning the aiming screw 31. The teeth 64 and 65 of the second sliding member 6, which are in mesh with the threads 36 of the aiming screw 31, serve as a nut. So the first and second sliding members 5 and 6

(blocked against their relative movement after the first sliding member 5 is moved to the second position) slide in relation to the cylindrical member 17 of the lamp housing 10. This sliding amount of the first and second sliding members 5 and 6 can be read from the relation of the reference point mark 7 with the graduations 70 as the optical-axis adjustment of the movable reflector 2.

As described above, the optical-axis adjustment checker according to the present invention comprises only the first and second sliding members 5 and 6 except for the relevant parts of the automotive headlamp. Namely, the device according to the present invention is comprised of a reduced number of elements as compared with the conventional devices.

FIG. 14 shows the second embodiment of optical-axis adjustment checker according to the present invention. This embodiment will be described with reference to a movable-unit type automotive headlamp. In FIG. 14, reference numerals like or similar to those in FIGS. 1 through 13 designate corresponding elements.

In this automotive headlamp, a lamp unit 100 of which the optical axis is to be adjusted is mounted to a car body 103 at three points, namely, by means of a pivot 104, horizontal optical-axis adjuster 3 and vertical optical-axis adjuster (not shown). The car body 103 has an aiming screw 31 of the optical-axis adjuster mounted therein so as to be rotatable but axially stationary by an assembly 32 of a push nut and a wave washer. The lamp unit 100 has mounted thereon a cylindrical member 109 in which a screw mount 30 is supported so as to be non-rotatable about the axis of the aiming screw 31 driven in the screw mount 30.

The lamp unit 100 comprises a lamp housing 101 and lens 102 which define together a bulb space (not shown) in which a lamp bulb (not shown) is provided. When turned on, the lamp bulb emits light. The light is irradiated through the lens 102 forwardly of the headlamp to provide a predetermined pattern of luminous intensity distribution.

Next, the optical-axis adjustment will be discussed below:

When a hexagonal head 34 of the aiming screw 31 is turned by hand or with a tool at the back of the automotive headlamp, the screw mount 30 is moved axially with respect to the aiming screw 31. Correspondingly, the lamp unit 100 is tilted horizontally about a vertical axis connecting the pivot 104 and vertical optical-axis adjuster (not shown).

The horizontal optical-axis adjuster is illustrated but not the vertical optical-axis adjuster. However, it should be noted that the vertical optical-axis adjuster is generally identical in construction and function to the horizontal optical-axis adjuster.

The car body 103 has a cylindrical member 17 in which first and second sliding members 5 and 6 are installed in the same manner as in the aforementioned first embodiment. The cylindrical member 17 has a reference-point mark 7 formed thereon, and the first sliding member 5 has graduations 70 formed thereon.

Since the second embodiment of the present invention has the construction discussed above, it can provide the same effect as the first embodiment can.

In the aforementioned embodiments of the present invention, the graduations 70, including graduation 74, and detents 50 are formed on the first sliding member 5. It should be noted, however, that the graduations and detents may be formed on the second sliding member 6 or on both the first and second sliding members 5 and 6.

In the aforementioned embodiments the end face 73 of the step 72 is used as a reference point 7 on the cylindrical member 17 (to which the optical-axis adjustment checker is installed). However, the present invention is not limited to this arrangement, but "0" may be simply marked on the edge of the cut 71 in the cylindrical member 17.

Although the embodiments of the present invention have been described concerning the checking of the optical-axis adjustment by the horizontal optical-axis adjuster, the optical-axis adjustment checker according to the present invention is also applicable for checking the optical-axis adjustment done by the vertical optical-axis adjuster.

What is claimed is:

1. In an automotive headlamp comprising:

a base member; and a tilting member supported on said base member by means of a pivot, horizontal optical-axis adjuster and a vertical optical-axis adjuster and of which an optical-axis direction of the headlamp is to be adjusted;

each of said horizontal and vertical optical-axis adjusters including an aiming screw mounted on said base member rotatably but axially immovably and a nut member mounted on said tilting member and engaged with one end portion of said aiming screw;

said tilting member being tilted horizontally and vertically in relation to said base member by manually turning said corresponding aiming screw, thereby adjusting the optical-axis direction of the headlamp;

the improvement of an optical-axis adjustment checker, comprising:

a threaded portion formed on the other end portion of said aiming screw;

a cylindrical member formed enclosing said threaded portion and integrally with said base member;

a first sliding cylindrical member disposed coaxially inside said cylindrical member and enclosing said threaded portion, said first sliding member being slidable axially;

a second sliding cylindrical member disposed inside said first sliding member, said first sliding member being slidable from a first to second position in relation to said second sliding member;

a means disposed between said first and second sliding members to block said first sliding member taking said first or second position from sliding relative to said second sliding member;

elastic flap members formed on said second sliding member and one of which has at least a stopper which is elastically engaged with said cylindrical member when said first sliding member is in said first position;

a means of elastically disengaging said flap member from said cylinder member when the first sliding member is slid from said first to second position;

teeth formed integrally on said flap members and which are engaged with said threaded portion upon said elastic disengagement of said flap member from said cylindrical member; and graduations and reference-point mark formed on either of said first and second sliding members and said base member correspondingly to said second position of said first sliding member.

2. An optical-axis adjustment checker as set forth in claim 1, wherein said first and second sliding members are provided on said horizontal optical-axis adjuster.

3. An optical-axis adjustment checker as set forth in claim 2, wherein said cylindrical member has formed therein cuts in which said stopper of said flap member is engaged; and said flap members including a first flap always forced toward said cylindrical member and a second flap always forced toward said threaded portion, said first flap having said stopper formed thereon in a position opposite to said cylindrical member and a tooth formed therein in a position opposite to said threaded portion, said second flap having formed said teeth in a position opposite to said threaded portion at every two pitches of said aiming screw.

4. An optical-axis adjustment checker as set forth in claim 2, wherein said cylindrical member has formed therein a window through which the graduations formed on said first sliding member are viewed from outside.

5. An optical-axis adjustment checker as set forth in claim 2, wherein there is provided a detent to block relative rotation of the first and second sliding members.

6. An optical-axis adjustment checker as set forth in claim 2, wherein said first sliding member have formed thereon horizontal extensions perpendicular to the axis thereof, said cylindrical member having formed therein elongated recesses in which said extensions are guided when sliding axially thereof, whereby said first and second sliding members are blocked from rotating about the axis of said cylindrical member.

* * * * *